Sept. 23, 1958

M. M. BOYD 2,853,205

BOTTLED MILK COOLER AND WARMER AND
CONVEYING MEANS THEREFOR

Filed April 12, 1956

INVENTOR.
MARJORIE M. BOYD
BY
ATTORNEY

INVENTOR.
MARJORIE M. BOYD
BY
ATTORNEY

United States Patent Office 2,853,205
Patented Sept. 23, 1958

2,853,205

BOTTLED MILK COOLER AND WARMER AND CONVEYING MEANS THEREFOR

Marjorie M. Boyd, Leonia, N. J.

Application April 12, 1956, Serial No. 577,844

1 Claim. (Cl. 221—15)

This invention relates to new and useful improvements in infant feeding apparatus.

More particularly, the present invention proposes the construction of an improved bottle and food warmer and cold storage device which can be used to make infant or invalid feeding and food storage convenient, compact and quick at night and other times when a kitchen is inconvenient to get to or unavailable.

As a further object, the invention proposes forming the device with an insulated cold storage compartment adapted to hold and cold store filled nursing bottles or other food and food containers for at least twelve hours within a safe temperature range and with a warming well adapted to heat a nursing bottle or other food and food containers.

Still further, the present invention proposes constructing the device with a night light and an alarm clock, the alarm of which can be set for a desired time and electrically to connect the night light, warming well heating unit and clock so that when the alarm activates the light will go on, the alarm will sound and the heating element in the warming well will begin to operate.

Another object of the invention proposes constructing the device so that it can be manually operated with the heating element in the warming well operating only when a bottle or other food container is placed in the warming well and ceasing to operate when the bottle or other food container is removed.

A further object of the invention proposes providing thermal controls for the heating element in the warming well so that it will never exceed a maximum desired heat, for example 100° F.

The invention further proposes forming the device with a cold storage compartment which can hold ice as well as other refrigerants and which can store at least the cubes from two small trays of ice cubes with a conveniently operable drain plug or faucet for the compartment.

Still further, another object of the invention proposes providing means in the device automatically to raise and convey a bottle from the storage compartment to the warming well when the alarm activates.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
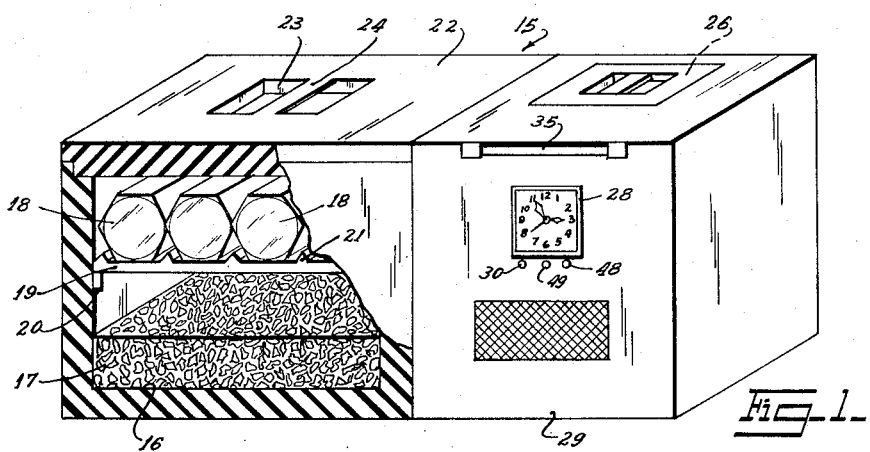
Fig. 1 is a front perspective view with parts broken away and shown in section of a bottle and food warmer and cold storage device constructed and arranged in accordance with the present invention.
Figure 2:
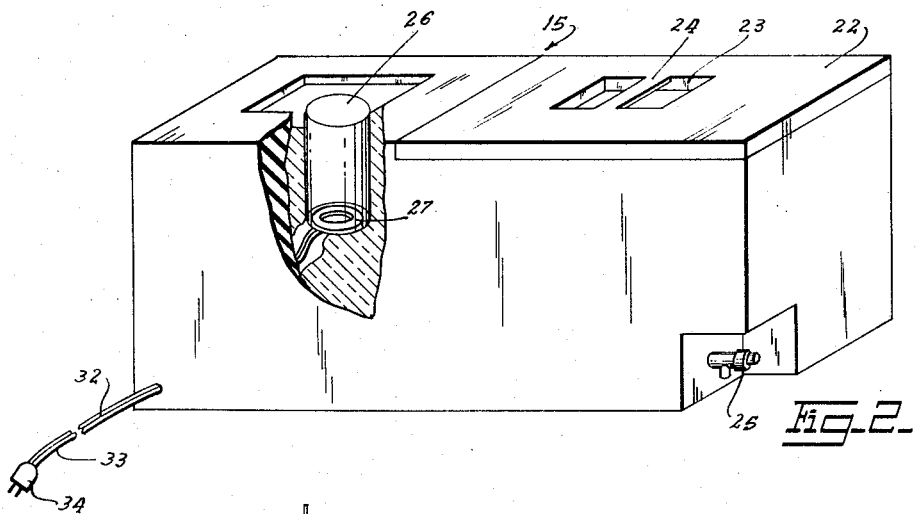
Fig. 2 is a rear perspective view similar to Fig. 1 of the device, parts being removed.
Figure 3:
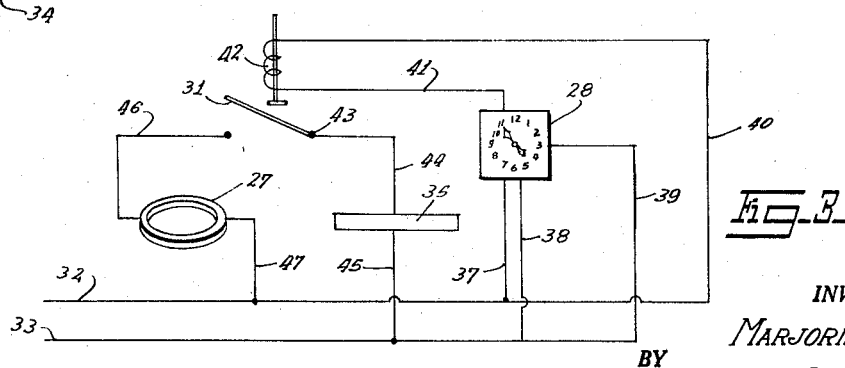
Fig. 3 is a schematic and diagrammatic view showing a possible wiring arrangement.

The bottle and food warmer and cold storage device, in accordance with the first form of the invention illustrated in Figs. 1, 2 and 3, has a cabinet 15 which preferably is small enough for a bedside table. As an example, the cabinet size may be fifteen inches long, eight and one-half inches deep and seven and one-half inches long.

Cabinet 15 has an insulated compartment 16 with a lower half of the compartment adapted to hold a refrigerant, such as ice 17 and an upper half of the compartment adapted to hold a plurality of nursing bottles 18. A removable shelf 19 fits in the compartment 16 on brackets 20 to hold the bottles 18 and shelf 19 may be provided with spaced raised portions 21 to separate the bottles when there is less than the full number in the compartment.

Compartment 16 as shown is adapted to hold four bottles 18. The compartment has a removable lid 22 with a recessed handle gripping portion 23 and a flush handle 24. Preferably, the lower half of the compartment 16 is adapted to hold ice 17 in the form of cubes from at least two small trays of ice cubes. A push faucet or drain 25 is provided in the cabinet 15 for compartment 16 at the rear of the cabinet.

Cabinet 15 has a top portion with a bottle and food warming well 26 spaced from the compartment 16 and adapted to hold one of the bottles 18 or other food containers for heating. A heating coil or element 27 is mounted in the well 26 at the bottom thereof. Suitable thermostatic controls such as the usual bimetallic strips (not shown) may be provided to keep the heating element 27 from exceeding a selected temperature, for example 100° F.

A clock 28 is also mounted in the cabinet 15 in the front face 29 of the cabinet. Clock 28 is of the usual alarm type with an alarm setting knob 30 disposed on the front face 29 of the cabinet 15 to provide presettable means for the alarm.

The heating coil 27 is provided with a heating coil switch 31 which connects it with a source of electric energy through cord wires 32 and 33 and plug 34, the cord and plug being the means of connecting the entire device electrically to a current source.

Clock 28 is spaced from the compartment 16 and well 26 in the cabinet. The alarm setting knob 30 permits the alarm mechanism of the clock (not shown) to be set for any desired time. The alarm may also be a musical alarm or may be the usual alarm followed by musical chimes after a timed interval, all as is well known in alarm mechanisms.

A night light or lamp 35 is mounted on the cabinet 15 adjacent the block face, the well 26 and compartment 16 so as to supply light for each of these. Lamp 35 may be either of the usual incandescent type or the fluorescent type as shown.

The alarm of the clock and the heating coil switch and the lamp 35 all are electrically connected so that when the alarm is activated, the lamp will light and the heating coil will be energized. One way of accomplishing this is shown in the diagram of Fig. 3. Power lines or wires 32 and 33 are connected with a source of electric power. Clock 28 is connected by lines 37 and 38 with wires 32 and 33 to run the clock electrically, the electric clock motor not being shown. In addition, the alarm mechanism of the clock is connected through line 39 with power line 33 and by lines 40 and 41 with a switch closing coil 42 adapted when energized to close the normally open heating element switch 31. The coil 42 may be that of a solenoid or any other well-known mechanical or electrical switch closing device.

Switch 31 has one terminal 43 connected through line 44, lamp 35 and line 45 with the power line 33. The other terminal of switch 31 is connected through line 46, heating coil or element 27 and line 47 with the other power line 32. On the closing of the switch 31 by the clock, the lamp and heating coil are energized. Switch 31 is of the type that when once closed it will remain closed until manually opened by the "turn-off" knob 48 on the front face of the cabinet. The same knob 48 mounted on cabinet 15 may be used manually to close the switch when so desired. A clock hand-setting knob 49 may also be provided.

Figure 4:
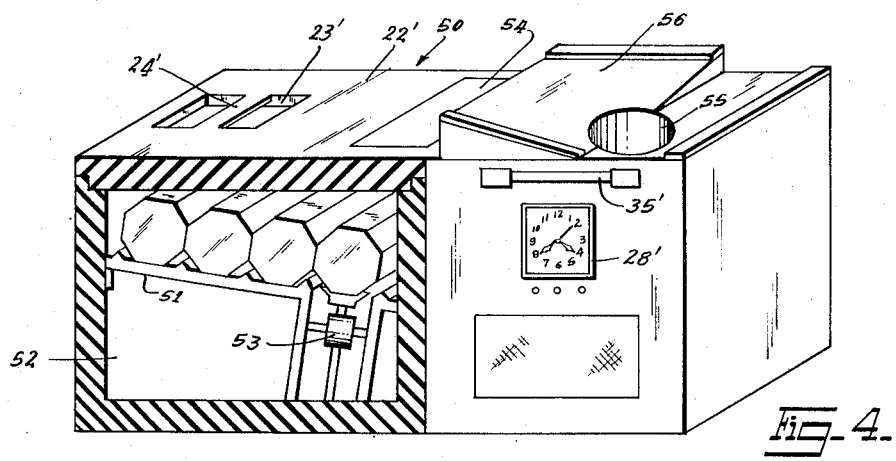
Fig. 4 is a view similar to Fig. 1 but illustrating a modification of the present invention.
Figure 5:
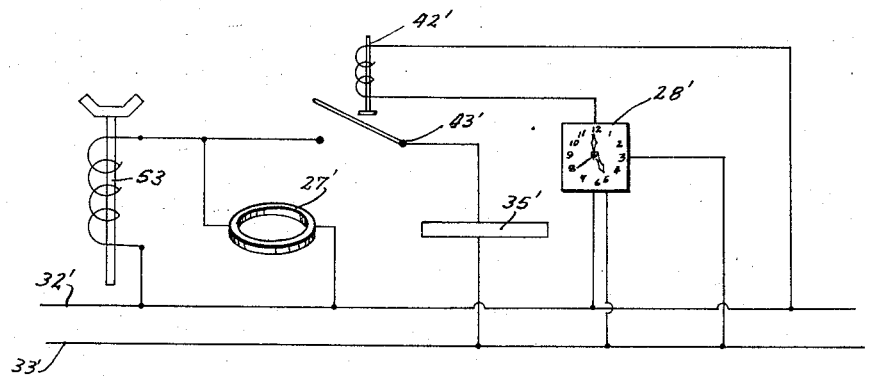
Fig. 5 is a view similar to Fig. 3 but for the structure shown in Fig. 4.

The modification of the invention illustrated in Figs. 4 and 5 is somewhat similar to that shown in Figs. 1, 2 and 3 and like parts are given like reference numerals but primed to distinguish the figures. The cabinet 50 of the modified form, however, has a tilted bottle holding shelf 51 in cold storage compartment 52 and a bottle raising solenoid 53 is provided at the lower side of the compartment to lift one bottle from the compartment. A bottle exit lid 54 on the top is adapted to be pushed up by the rising bottle.

Mounted on top of the cabinet between warming well 55 and the bottle raising solenoid 53 is a conveyor slide plate 56 which has a warped upper surface generally inclined toward the warming well in all planar directions so as to direct a raised bottle base end downwardly into the warming well. The well is generally cylindrical in form and has an open top located adjacent plate 56 so that all points on plate 56 are higher than the open top of the well, as shown in Fig. 4.

The other parts of the device shown in Figs. 4 and 5 are the same as those shown in Figs. 1, 2 and 3, the solenoid 53 being included in the electric circuit or circuits as, for example, indicated in Fig. 5.

Figure 6:
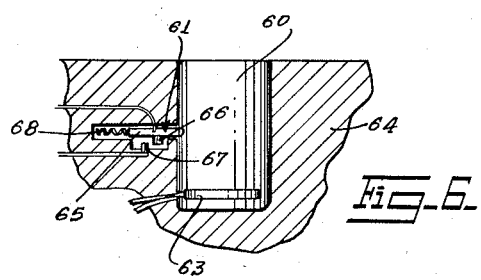
Fig. 6 is a fragmentary sectional view of a warming well and heating element illustrating another modification of the invention.

The modification of the invention illustrated in Fig. 6 is characterized by the provision of a warming well 60 having a side wall switch 61 for its heating element 63 so that the heating element 63 disposed in the cabinet 64 will be turned on and off respectively by the insertion and withdrawal of a bottle in and from the warming well. The switch 61 has a slide plunger 65 with a contact or terminal 66 thereon. A fixed contact or terminal 67 is located in the cabinet 64. A spring 68 normally keeps the plunger 65 partially extending into the warming well as shown. However, when a bottle is inserted into the well, the plunger is retracted and the contacts or terminals 66 and 67 become aligned completing a circuit to connect the heating element with a source of electricity. When the bottle is removed from the well, the spring 68 forces the plunger forward and separates the contacts or terminals 66 and 67 breaking the circuit and deenergizing the heating element.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A device of the kind described, comprising a closed refrigeration cabinet having a refrigerating compartment therein for storing bottles of food, a vertically movable support disposed in said compartment and having means for supporting and raising one bottle in the compartment, an electrically energized solenoid disposed below and operatively connected to said support for raising said one bottle, a timing means mounted on the cabinet and connected in electrical circuit with said solenoid for actuating the solenoid at a predetermined time, a lid closing said compartment and adapted to be pushed up by the raised bottle when said solenoid is actuated, said cabinet having a cylindrical warming well with an open top spaced from said compartment, and a conveyor slide plate mounted on top of the cabinet adjacent said well, said plate having a warped top surface so that all points thereon are higher than the open top of the well, said surface being so inclined that the bottle raised by said support is discharged upon the plate and is conveyed base end downwards into the well for warming therein.

References Cited in the file of this patent

UNITED STATES PATENTS

| | | |
|---|---|---|
| 1,979,222 | Goodwin | Oct. 30, 1934 |
| 2,119,455 | Ayala | May 31, 1938 |
| 2,309,513 | Kramer | Jan. 26, 1943 |
| 2,584,435 | Doerr | Feb. 5, 1952 |
| 2,765,900 | Seabrooke | Oct. 9, 1956 |